US009025286B2

(12) United States Patent
Washburn et al.

(10) Patent No.: US 9,025,286 B2
(45) Date of Patent: May 5, 2015

(54) ASSEMBLY OF ELECTRIC MOTOR STARTER COMPONENTS

(75) Inventors: Keith Washburn, Natick, MA (US); Christian V. Pellon, Norton, MA (US); Kevin Dropps, Berkley, MA (US); Mark C. Carlos, Lincoln, RI (US); Daniel Quinn, East Wareham, MA (US)

(73) Assignee: Sensata Technologies Massachusetts, Inc., Attleboro, MA (US)

( * ) Notice: Subject to any disclaimer, the term of this patent is extended or adjusted under 35 U.S.C. 154(b) by 252 days.

(21) Appl. No.: 13/530,338

(22) Filed: Jun. 22, 2012

(65) Prior Publication Data

US 2012/0327539 A1 Dec. 27, 2012

Related U.S. Application Data

(60) Provisional application No. 61/500,184, filed on Jun. 23, 2011.

(51) Int. Cl.
*H02H 5/04* (2006.01)
*H01H 61/00* (2006.01)
*F04B 39/12* (2006.01)

(52) U.S. Cl.
CPC ............ *H01H 61/002* (2013.01); *F04B 39/121* (2013.01)

(58) Field of Classification Search
USPC ........ 318/788, 792; 361/22; 62/298; 337/112
See application file for complete search history.

(56) References Cited

U.S. PATENT DOCUMENTS 4,276,506 A * 6/1981 Little ............................ 318/806
4,355,458 A * 10/1982 Woods et al. ................ 29/602.1
4,422,120 A * 12/1983 Kobayashi et al. ............. 361/24
4,689,595 A * 8/1987 Jorgensen ...................... 337/107
4,862,306 A * 8/1989 Lisauskas ........................ 361/24
5,170,307 A * 12/1992 Nacewicz et al. ............... 361/24
5,475,610 A * 12/1995 Atwood et al. ............... 700/269
5,602,756 A * 2/1997 Atwood et al. ............... 700/269
5,617,001 A * 4/1997 Nacewicz et al. ............. 318/788
5,729,416 A * 3/1998 Renkes et al. .................. 361/23
6,564,568 B1 * 5/2003 Shen ............................... 62/230
6,975,283 B2 * 12/2005 Matsui et al. .................. 345/2.1

(Continued)

FOREIGN PATENT DOCUMENTS

EP 1569325 A2 8/2005
EP 1657733 A1 5/2006
EP 2053322 A2 4/2009

OTHER PUBLICATIONS

Partial European Search Report, EP12173426.

*Primary Examiner* — Rita Leykin
(74) *Attorney, Agent, or Firm* — Chapin IP Law, LLC

(57) ABSTRACT

Techniques disclosed herein include systems and methods for assembly of electric motor starter connecting packages that enable increased automation and reduced assembly via top-down assembly of circuit components, thereby allowing robotic placement, connection, and securing of circuit components. The connecting package can include an electric motor starter, with optional overload protector, packaged as one unit. The motor starter can include an electrical circuit containing a triac, current transformer, Positive Temperature Coefficient (PTC) element, resistor, and a capacitor. A cover and base of the connecting package enclose and firmly secure connected circuit elements without needing a circuit board or filler material. The device design enables quick testing of the motor starter circuit and circuit elements after being enclosed by the housing.

26 Claims, 10 Drawing Sheets

(56) References Cited

U.S. PATENT DOCUMENTS 7,061,204 B2 * 6/2006 Unno ............................ 318/786
7,240,508 B2 * 7/2007 Park ................................ 62/298
7,554,284 B2 * 6/2009 Zhao ............................. 318/787

* cited by examiner

ASSEMBLY OF ELECTRIC MOTOR STARTER COMPONENTS

CROSS REFERENCE TO RELATED APPLICATIONS

The present application claims the benefit of U.S. Provisional Patent Application No. 61/500,184, filed on Jun. 23, 2011, which is incorporated herein by reference in its entirety.

BACKGROUND

The present disclosure relates to motor starters, and more particularly to motor starters and connecting packages for compressors such a gas compressors and refrigerator compressors.

Electric motors that are used with cooling or refrigeration compressors are typically energized or controlled by a motor starter. Typically, a motor starter device and an overload protector are mounted on the outside of the refrigerator compressor or the outside of a housing of the refrigerator compressor. Motor starters themselves often have a housing and terminals for connection to the refrigerator compressor. As such, motor starters are generally manufactured separately from the refrigerator compressor. The housing of motor starters can contain various circuit elements such as a capacitor and Positive Temperature Coefficient (PTC) element.

SUMMARY

Motor starter connecting packages are conventionally manufactured as high-volume, low-cost devices. Accordingly, maintaining low manufacturing costs becomes important. With respect to high-volume manufacturing, increased automation in assembly of such devices usually results in a relatively lower manufacturing cost per item. Conventional motor starter connecting packages, however, often have some components that require assembly by hand due to device design and/or assembly orientation. Hand assembly of components can significantly increase assembly cost.

Cost per item is also affected by quality control conventions and/or requirements. Quality control measures can include testing of the motor starter and/or various circuit elements. Connecting packages usually have a housing or cover that protects motor starter circuit elements. Prior to enclosing the circuit elements in the housing, circuit elements can be individually tested, and the motor starter circuit as a whole can be tested. The ability to test components individually can be an important time-saving step (and thus cost saving). For example, in motor starter connecting packages that include a PTC element, testing the circuit as a whole can cause the PTC element to heat up such that the PTC element must cool for several minutes before additional testing can be completed. Before the circuit is covered or housed, however, individual circuit elements can be tested separately so that testing that causes the PTC element to heat up can be completed as a last testing step. One disadvantage of such testing prior to covering or enclosing the circuit elements is the potential for disruption of the circuit elements during the enclosing process. For example, a given housing can be snapped together and can include a potting or filler material. Adding filler material and/or the act of mechanically enclosing circuit elements can physically jar or move the circuit elements, which can result in a defective device. Testing devices after enclosing the motor starter, however, can increase assembly and testing time due to some electrical tests causing certain elements to heat, resulting in a need to wait for heated elements to cool before completing electrical testing, and thus such testing subsequent to covering the circuit elements has challenges.

Techniques disclosed herein include systems and methods for assembly of electric motor starter connecting packages that enable increased automation and reduced assembly time. The systems and methods include a device design that enables top-down assembly of circuit components, thereby allowing robotic placement, connection, and securing of circuit components. The device design also enables securely connecting the motor starter circuit with housing components without needing a circuit board or potting material. The device design also enables quick testing of the motor starter circuit and circuit elements after being enclosed by the housing. Additionally, the device design provides a universal base that can receive various cover and terminal configurations.

One embodiment includes a connecting package for a compressor (such as a gas compressor or a refrigeration compressor), generally comprised of an electric motor starter circuit, a base, and a cover. The electric motor starter circuit has circuit elements including a triac, a positive temperature coefficient (PTC) element and terminals configured to connect to the compressor. The base includes a first electric motor starter circuit support structure, and is configured to receive the circuit elements in a z-axis direction for assembling the electric motor starter circuit on the base. For example, the base can be constructed/molded to define walls, mounting supports, cavities, slots, etc., such that the base can receive circuit elements being positioned on the base from a top-down assembly direction. The cover includes a second electric motor starter circuit support structure. The cover is also configured to couple to the base such that when the cover and base are coupled together, they form an enclosure of the electric motor starter circuit in which the electric motor starter circuit is firmly secured between the first electric motor starter circuit support structure and the second electric motor starter circuit support structure by action of opposing force from the first and second electric motor starter circuit support structures. Thus, the cover and base each have corresponding structures, walls, protrusions, etc., designed so that they can press between them, motor starter elements. The circuit elements form a circuit by directly joining respective circuit element leads together, instead of using a lead frame configuration, circuit board or potting material.

The connecting package (base and cover) can also include mounting sections for an overload protector to couple with the enclosed motor starter circuit. The connecting package can also include a test terminal connected to the electric motor starter circuit and accessible from an exterior of the enclosure for testing the electric motor starter circuit when firmly secured within the enclosure. The base can be constructed with relatively low sidewalls, thereby increasing access to structures within the base by automated assemblers.

Embodiments herein further include a method of manufacturing or producing the connecting package. For example, in one embodiment, a robotic assembler receives or provides a base that has an exterior side and an interior side. The exterior side has a substantially planar surface that extends in an x-axis direction and in y-axis direction, such as a floor or bottom surface. The interior side has a first electric motor starter circuit support structure extending in a z-axis direction. The z-axis direction is relative to the exterior side being positioned horizontally for assembly. The manufacturing process can then use automated robotic equipment to place circuit elements, of an electric motor starter circuit, along the z-axis direction into a first electric motor starter circuit support structure. The circuit elements can include a triac, a positive temperature coefficient (PTC) element, and a terminal for connection to the compressor.

Automated equipment can then create the electric motor starter circuit by welding circuit element leads within the first electric motor starter circuit support structure. A cover can then be coupled to the base, such as by pressing the cover over the base and circuit elements. The cover includes a second electric motor starter circuit support structure and a second overload protector mounting section. The cover and base together form an enclosure of the electric motor starter circuit such that the electric motor starter circuit is firmly secured between the first electric motor starter circuit support structure and the second electric motor starter circuit support structure by action of opposing force from the electric motor starter circuit support structures when the cover is coupled to the base. In other words, the cover and base squeeze together the motor starter circuit at various locations, such that no circuit board or filler material is needed to provide sufficient support to the circuit. This method can also include testing the electric motor starter circuit, after coupling the cover to the base, via a test terminal connected to the electric motor starter circuit and exposed by test port defined by the enclosure. Such exposure can include an opening to receive a test probe, or the terminal protruding through the test port. After testing the electric motor starter circuit, an overload protector can be mounted in the overload protector mounting sections of the base and the cover in a manner so that the overload protector covers the test terminal. These and other embodiment variations are discussed in more detail below.

As mentioned above, note that embodiments herein can include a configuration of one or more computerized devices, hardware processor devices, assemblers, or the like to carry out and/or support any or all of the method operations disclosed herein. In other words, one or more computerized devices, processors, digital signal processors, assemblers, etc., can be programmed and/or configured to perform the method as discussed herein.

Additionally, although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Techniques disclosed herein include systems and methods for assembly of electric motor starter connecting packages that enable increased automation and reduced assembly time. The systems and methods include a device design that enables top-down assembly of circuit components, thereby allowing robotic placement, connection, and securing of circuit components. The device design also enables securely connecting the motor starter circuit with housing components without needing a circuit board or filler material. The device design also enables quick testing of the motor starter circuit and circuit elements after being enclosed by the housing. Additionally, the device design provides a universal base that can receive various cover and terminal configurations.

In general, example embodiments can include an electric motor starter, with optional overload protector, packaged as one unit. The motor starter can include an electrical circuit containing a triac (semiconductor switch), current transformer, Positive Temperature Coefficient (PTC) element, resistor, and a capacitor. The connecting package can also include a fusite pin that connects to the main winding of the motor, and various terminals. The electric motor starter can function as a low-power device as a result of the triac turning off the PTC element after motor start, which can save a few watts.

Figure 1:
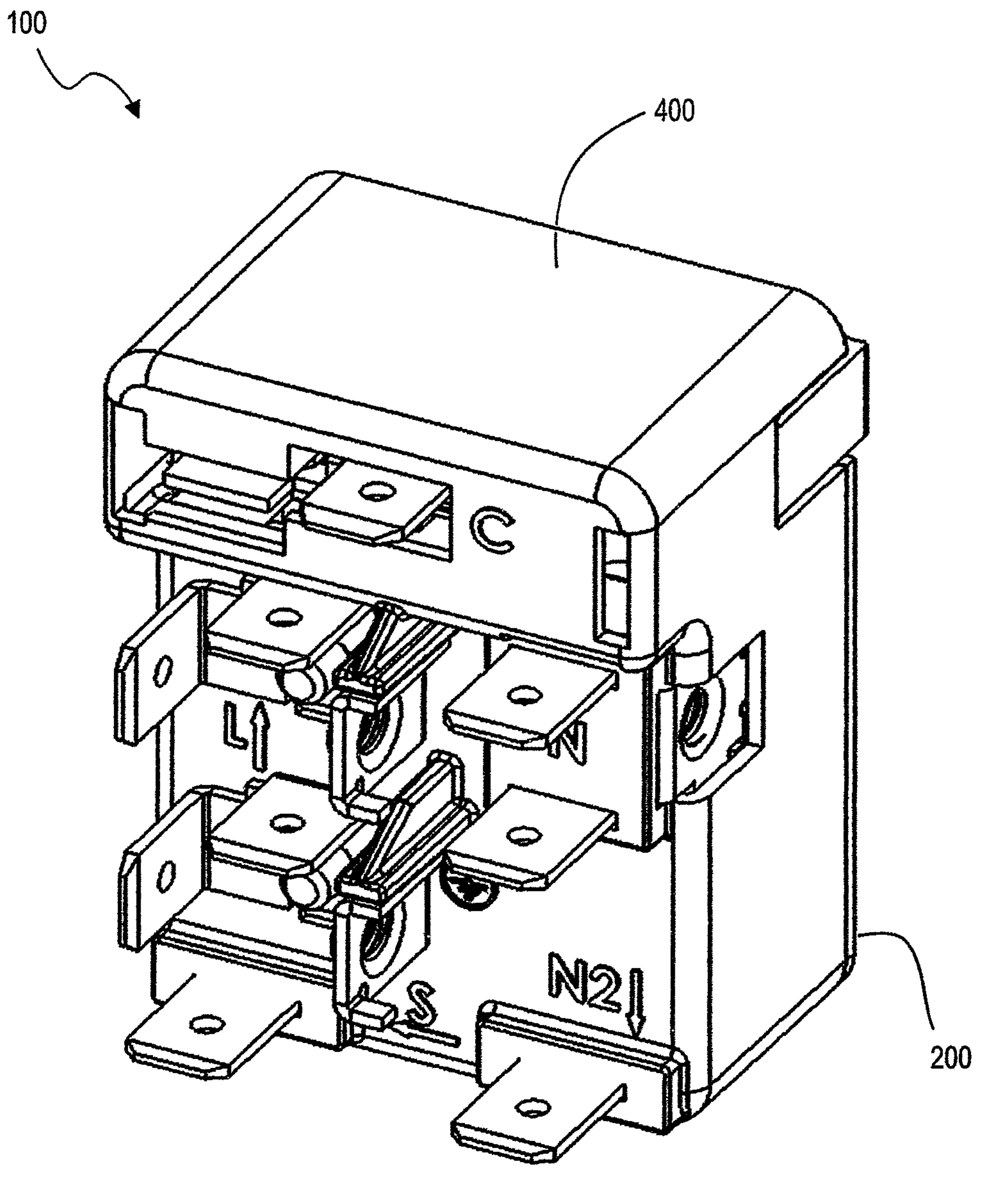
FIG. 1 is a perspective view of an example connecting package for a refrigerator compressor according to embodiments herein.

FIG. 1 is a perspective view of an example connecting package 100 for a refrigerator compressor (not shown) according to embodiments herein. The connecting package 100 includes cover 400, base 200, and various terminals for connecting with a refrigerator compressor.

Figure 2:
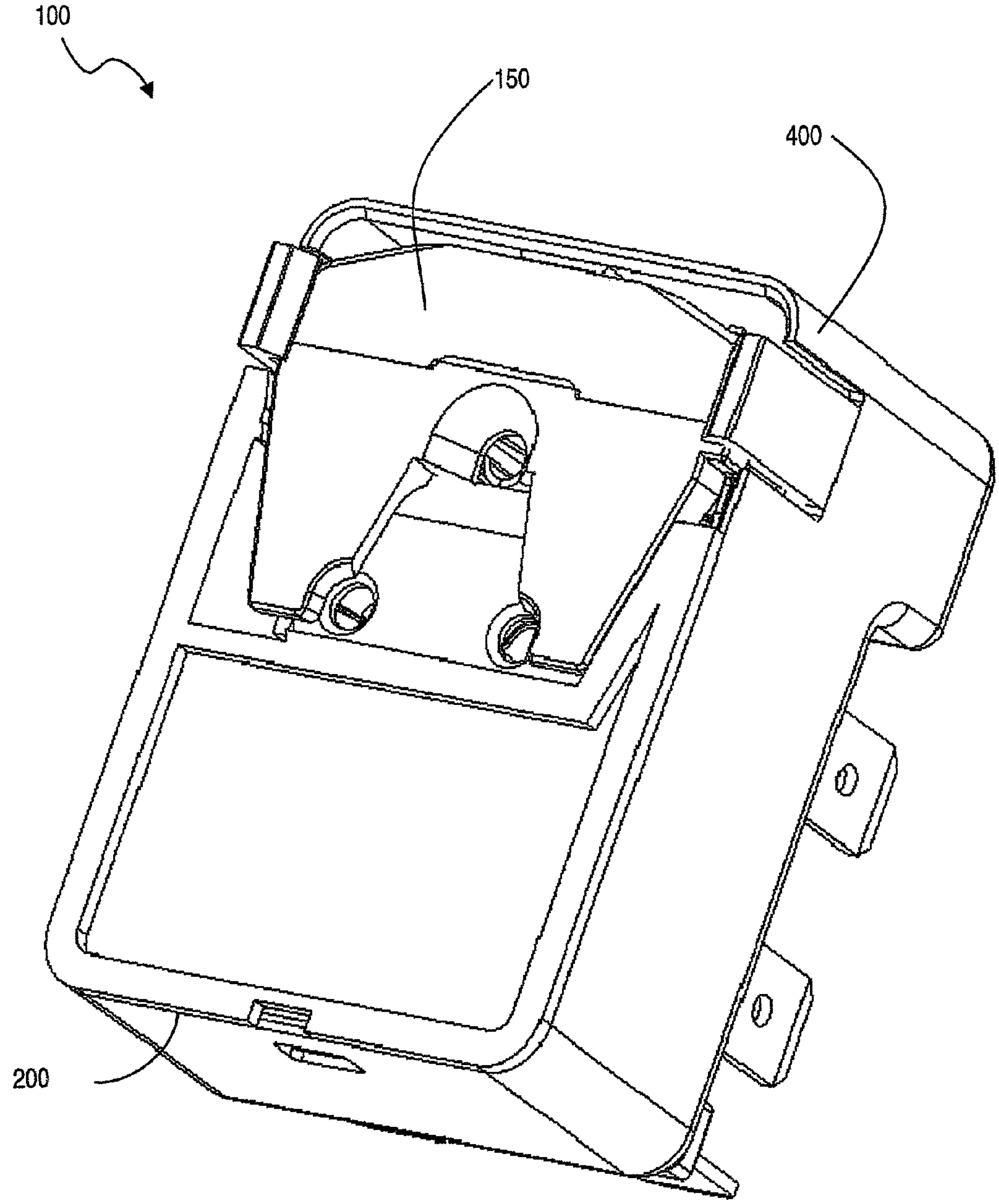
FIG. 2 is a perspective view of an example connecting package for a refrigerator compressor according to embodiments herein.

FIG. 2 is a perspective view of an example connecting package 100 for a refrigerator compressor from a back view of the connecting package 100. This view shows overload protector 150 mounted in an overload protector mounting section of the connecting package 100. The cover 400 and base 200 together for a housing for circuit elements and define an opening or space into which the overload protector 150 can be positioned or snapped into the connecting package 100.

Figure 3:
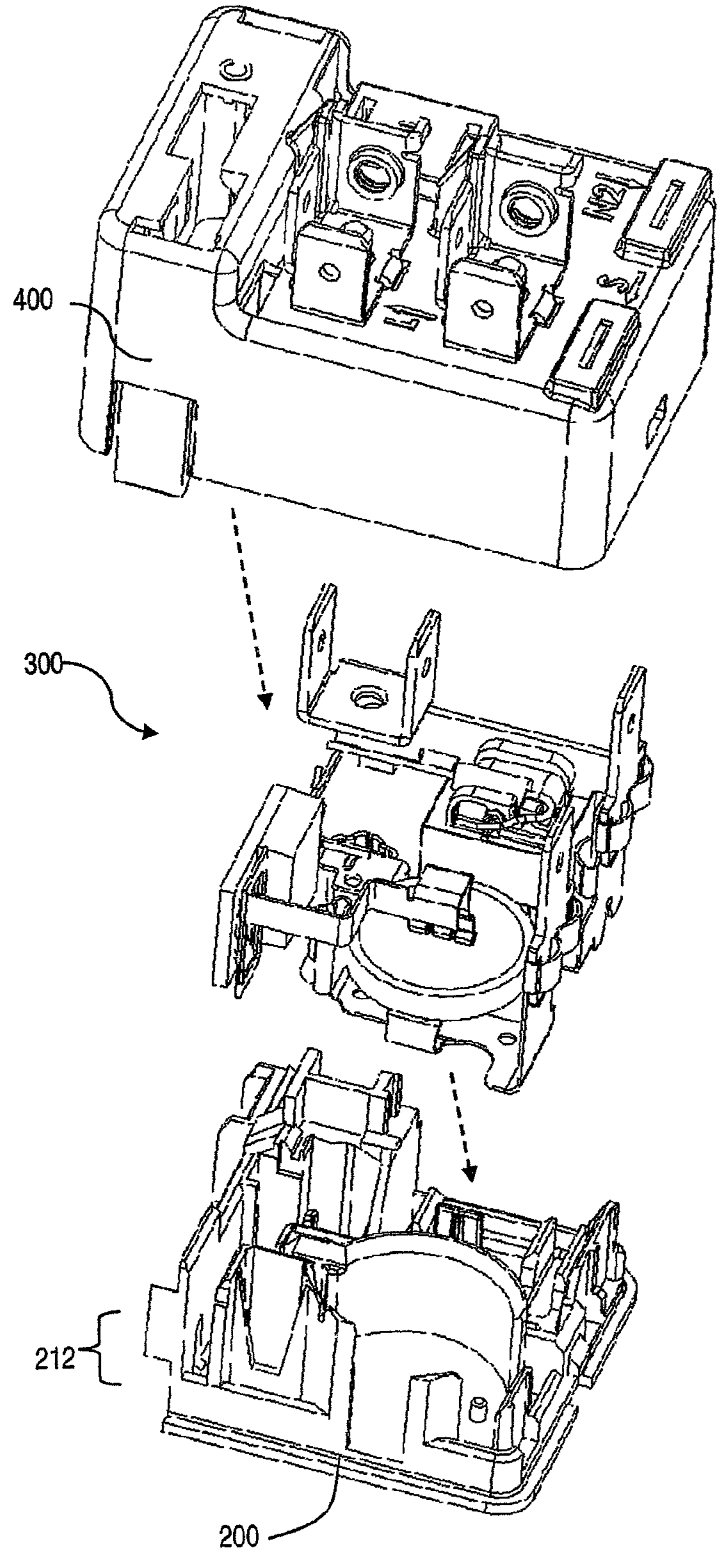
FIG. 3 is an exploded perspective view of an example connecting package for a refrigerator compressor according to embodiments herein.

FIG. 3 is an exploded perspective view of example connecting package 100. This view shows cover 400 separated from base 200. FIG. 3 also shows electric motor starter circuit 300, when not enclosed by the cover 400 and base 200. Electric motor starter circuit 300 includes various circuit elements or circuit components that will be described in subsequent figures. Section 212 of base 200 indicates a floor or bottom portion, which can be relative to an assembly orientation.

Figure 4:
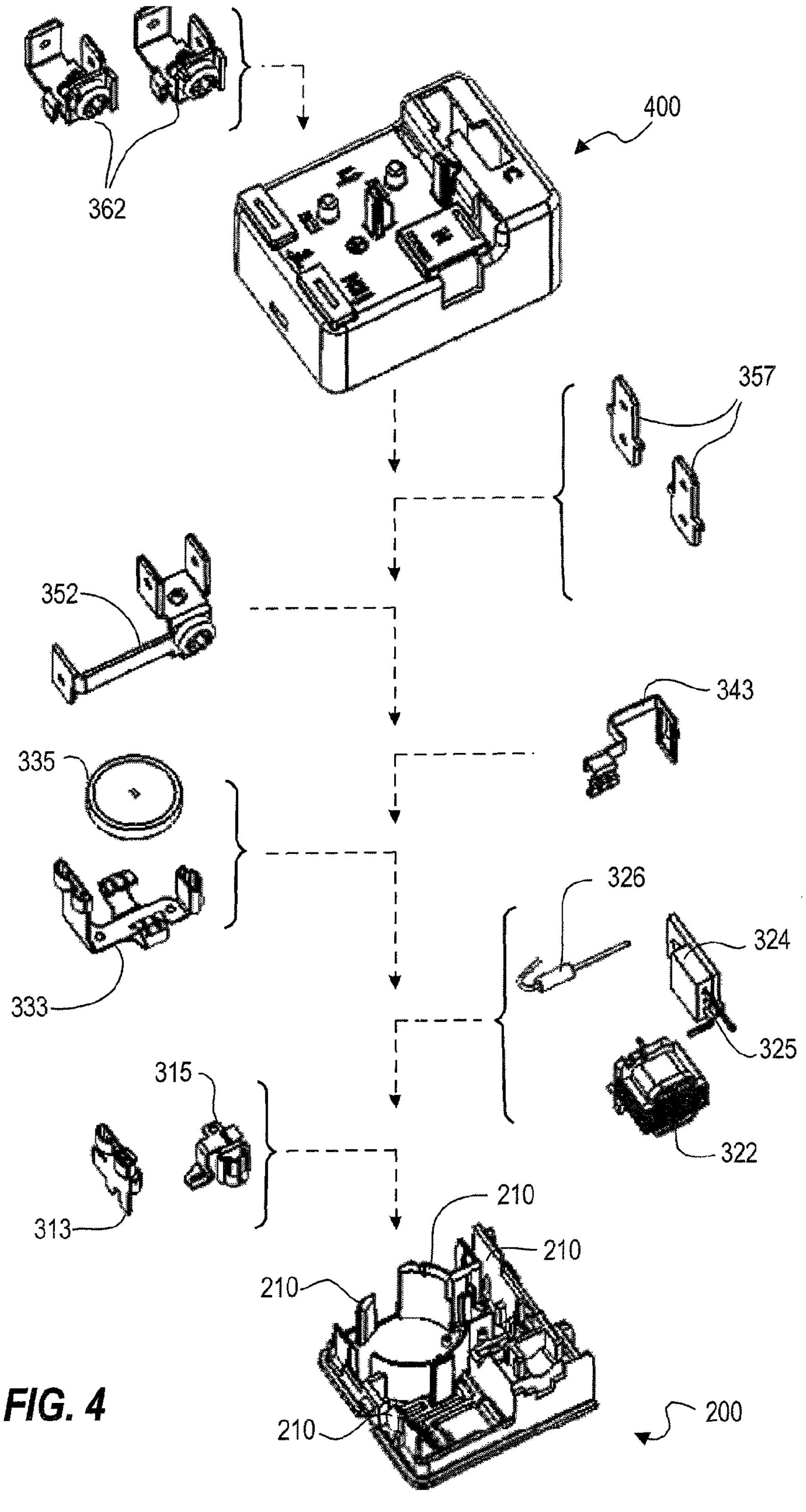
FIG. 4 is an exploded perspective view of an example connecting package for a refrigerator compressor according to embodiments herein.

FIG. 4 is an exploded perspective view of example connecting package 100, with circuit elements from electric motor starter circuit 300 separated to help illustrate an example assembly sequence. Note that circuit elements can be assembled in various sequences, and thus assembly is not limited by this specific example sequence. FIG. 4 also illustrates a top-down (z-axis) assembly direction. While an assembled connecting package 100 can connect to a refrigerator compressor in various orientations and positions, during assembly, the base 200 can be oriented horizontally to rest on a horizontal surface, such as a conveyor belt, assembly line, assembly station, etc.

Base 200 includes a first electric motor starter circuit support structure 210. Electric motor starter circuit support structure 210 can include various walls, protrusions, defined openings, slots, platforms, and so forth, which correspond to circuit elements of electric motor starter circuit 300. Base 200 can be constructed with various techniques. When base 200 is made from a plastic material, base 200 can be formed using a mold with plastic injected into the mold, and then pulled from the mold. This mold pull direction can be identified as the z-axis direction, which is a vertical direction during assembly of circuit elements. Top-down assemblies have a higher tolerance stack up due to a potential for greater part dimensional variability in the z-axis. Conventionally, circuit elements of connecting packages are designed for assembly in the x-axis. This is because plastic part dimensions in the x-axis are generally more stable. X-axis assembly, however, typically requires manual placement of circuit elements. Thus, base 200 is configured to receive the circuit elements in a z-axis direction for mechanical assembly of the electric motor starter circuit on a bottom floor 212 of the base 200 prior to the cover being coupled to the base. With base 200 positioned horizontally, an automated robotic assembly system can place and connect circuit elements.

In one example assembly sequence, connectors 313 and 315 can be placed in a corresponding location in base 200. Current transformer 322, triac 324 (which can include capacitor 325), and resistor 326 can then be placed and connected to connectors 313 and 315. Circuit elements 322, 324, 325, and 326, can include leads that can be welded together and/or welded to connectors 313 and 315 via a robotic welding system. As a result, circuit elements can form a circuit by directly joining respective circuit element leads together. Next, opposing spring 333, can be inserted into the supporting structure of base 200. PTC element 335 can be embodied as a disc-shaped element, and placed to rest on opposing spring 333, which can include two contact points to support PCT element 335 and to provide electrical connectivity. Opposing spring 343, which also functions as an electrical connector, provides an opposing force to secure PTC element 335 within the connecting package 100. Note that depending on a selected assembly sequence, opposing spring 343 can be mounted in a support structure of cover 400, so that opposing spring 343 contacts PTC element 335 when the base and cover are joined. Likewise, connector 352 can be positioned within the support structure of the cover 400 or the base 200 prior to joining the cover and base. A portion of connector 352 can protrude from the cover 400 to function as a terminal. Some connectors, such as connector 313 and opposing spring 333, can include female receptacles for receiving terminal connectors 357. Terminals 362 can be placed on top of cover 400 to connect to circuit elements within the housing, or can be positioned within the connecting package 100 with a portion protruding or otherwise accessible for connection to a refrigeration compressor. Thus, the cover holds down circuit elements against the base. This differs from conventional connecting packages that rely on tight tolerances among molded components of the base to hold internal components in place in an x-axis.

Figure 5:
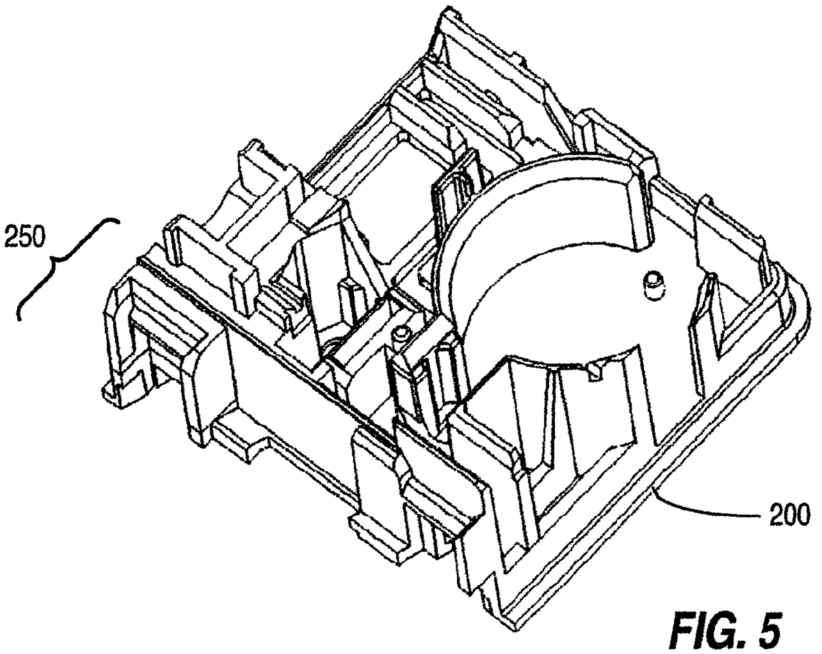
FIG. 5 is a perspective top view of an example base of a connecting package for a refrigerator compressor according to embodiments herein.

FIG. 5 is a perspective top view of an example base 200 of a connecting package. FIG. 5 illustrates an example first electric motor starter circuit support structure in more detail. Base 200 includes a first overload protector mounting section 250. Note that the first electric motor starter circuit support structure extends substantially beyond exterior surfaces of the base (sides or sidewalls), thereby facilitating automated top-down assembly of the electric motor starter circuit. In other words, base 200 can include an open base design to increase automation.

The base is designed to allow maximum clearance for automated grabbers. This design uses a minimum amount of plastic to nest circuit elements, with the cover having retaining features also. Enabling top-down assembly permits building connecting packages on a highly automated assembly system. For example, in conventional connecting packages where the PTC element is situated sideways (vertical) during assembly, this vertical orientation typically requires manual installation of each PTC element to insert the PTC element into the device during assembly. With such a top-down design, however, a base can be rested on an assembly surface with the opening to the base facing up. Then a machine is able to drop components into the housing from a top opening. Note that top-down refers to an assembly orientation, and not necessarily an orientation of the device when used as a component of another device, such as attached to a refrigerator compressor.

Conventional bases appear more like cover 400 in that such conventional bases are deep having relatively tall sidewalls and internal features. Such a deep base, however, makes it difficult for a robotic grabber to place components within the base. Typically, conventional robotic grabbers need space or clearance for placing the various components. Reaching deep into wells can be difficult to do. Thus embodiments of bases herein contain no walls or relatively short sidewalls thereby facilitating mechanical placement of components inside the base. The cover can then include wedges and other structural components for securing interior components and preventing vibration.

Figure 6:
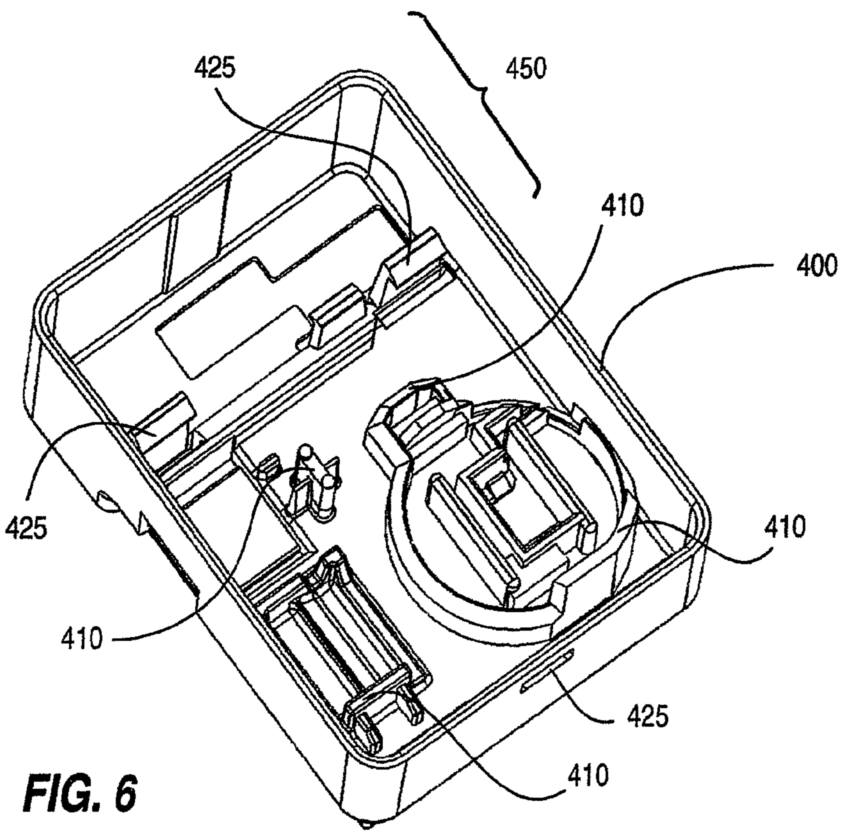
FIG. 6 is a perspective bottom view of an example cover of a connecting package for a refrigerator compressor according to embodiments herein.

FIG. 6 is a perspective bottom view of an example cover 400 of a connecting package. FIG. 6 illustrates an example second electric motor starter circuit support structure 410 in more detail. Cover 400 includes second overload protector mounting section 450. Note that various structures 410 from second electric motor starter circuit support structure correspond to structures within the base 200. Such structures can be sized and shaped so as to firmly secure the electric motor start circuit 300 between the first electric motor starter circuit support structure 210 and the second electric motor starter circuit support structure 410 by action of opposing force from the first and second electric motor starter circuit support structures. Thus, when the cover and base are coupled together, they form an enclosure of the electric motor starter circuit 300 such that the electric motor starter circuit 300 (or circuit elements) is firmly secured between the first electric motor starter circuit support structure 210 and the second electric motor starter circuit support structure 410 by action of opposing force from the first and second electric motor starter circuit support structures.

The cover 400 and/or base 200 can couple via snap fasteners 425 (molded into the base an cover), adhesive, external fasteners, or other joining mechanism that will provide sufficient opposing force to firmly secure circuit elements. With such a secure connection, the enclosure does not need to contain a potting material or filler material. Moreover, the circuit elements of the electric motor starter circuit do not need to be connected with a circuit board or other circuit support structure.

Figure 7:
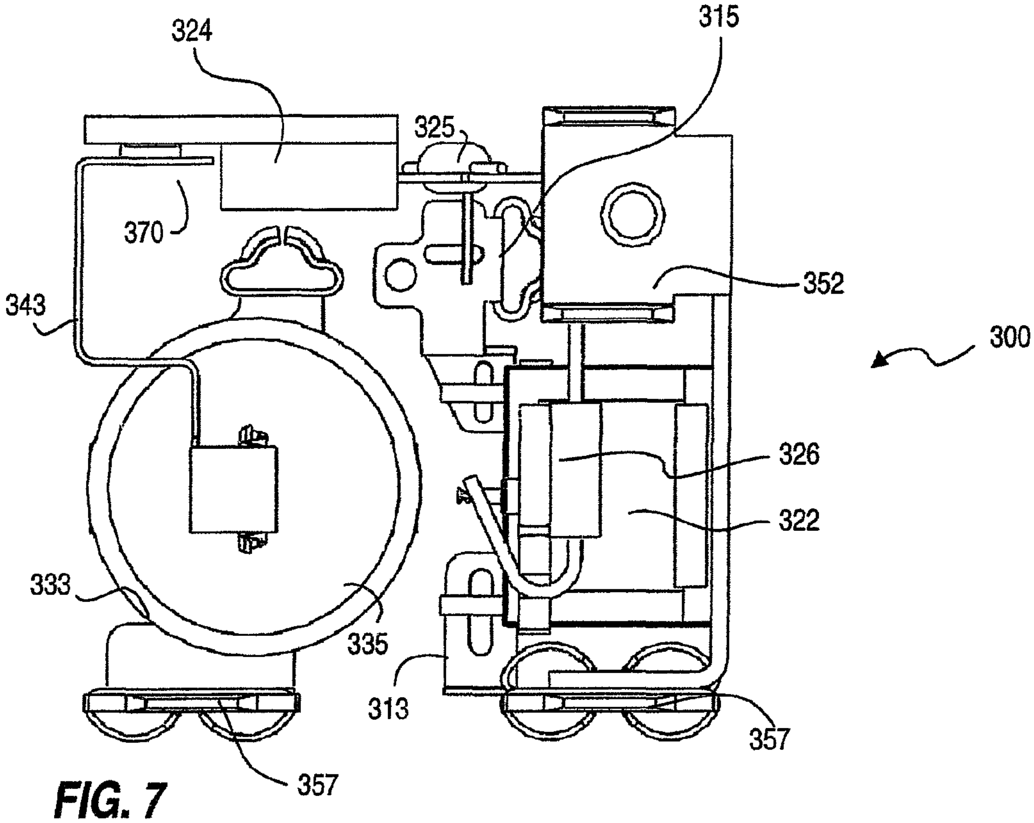
FIG. 7 is a perspective top view of an example motor starter circuit of a connecting package for a refrigerator compressor according to embodiments herein.

FIG. 7 is a perspective top view of an example motor starter circuit 300. This view shows example circuit elements (from FIG. 4) connected to form the motor starter circuit, but without the cover 400 or base 200. The circuit elements can form a circuit by directly joining respective circuit element leads together, such as by welding leads together without using a circuit board or lead frame. The base 200 and cover 400 will then provide structure to the circuit. Thus, leads of each component can be welded together such as to form a chain of electrical components that can be bent around each other, and can be easily dropped within the base or other housing.

Circuit elements of the motor starter circuit 300 can be joined together before or after being placed in the base 200, or a portion of the circuit elements can be joined prior to being placed in the base. A circuit assembly simply joined by leads can by relatively flimsy, but the combination of cover and base features (supporting structures) wedge or press circuit elements together in place for a stable circuit and so that leads are supported. Conventional techniques address this by filling the device with goop or low viscosity plastic material, or an epoxy. Techniques herein, however, do not need to do such filling because the directly connected circuit elements are supported with the combination housing structure of the cover and base.

Figure 8:
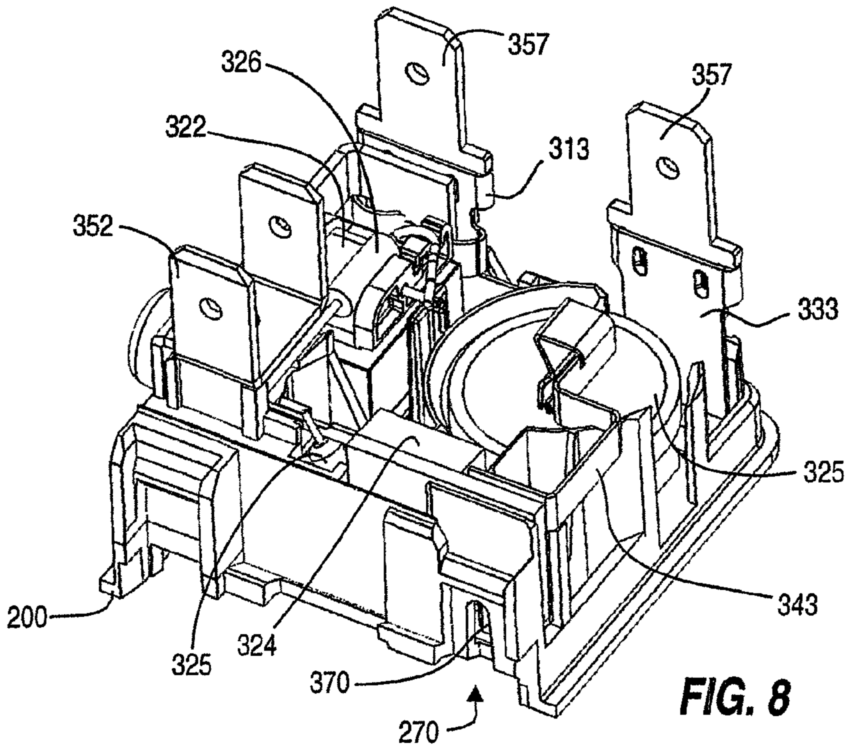
FIG. 8 is a perspective view of an example motor starter circuit and base of a connecting package for a refrigerator compressor according to embodiments herein.

FIG. 8 is a perspective view of motor starter circuit 300 and base 200 of connecting package 100. In this figure, the motor starter circuit 300 has been assembled within base 200, and illustrates placement of circuit elements from FIG. 4. Note that base 200 defines circuit test port 270, which can be an opening or hole in the base 200. From circuit test port 270, test terminal 370 is accessible to a testing lead or probe. Test terminal 270 can be embodied as part of opposing spring 343. Note that test terminal 370 is still accessible after the cover 400 is coupled to base 200. Thus, the enclosure defines a circuit test port that receives a test terminal connected to the electric motor starter circuit and accessible from an exterior of the enclosure for testing the electric motor starter circuit when firmly secured within the enclosure. Note that test terminal 370 is distinct from the terminals for connection to the refrigerator compressor.

The test terminal 370 connects to the electric motor starter circuit 300 at a location that enables testing of the triac 324 and PTC element 335 independently from testing the electric motor starter circuit. In one embodiment, the test terminal connects to the electric motor starter circuit 300 at a location configured to bypass the PTC element 335 to prevent the PTC element 335 from heating when executing a reference cut in measurement test. In one configuration, the test terminal provides an electrical connection to the motor starter electrical circuit 300 between the triac 324 and the PTC element 335.

Figure 9:
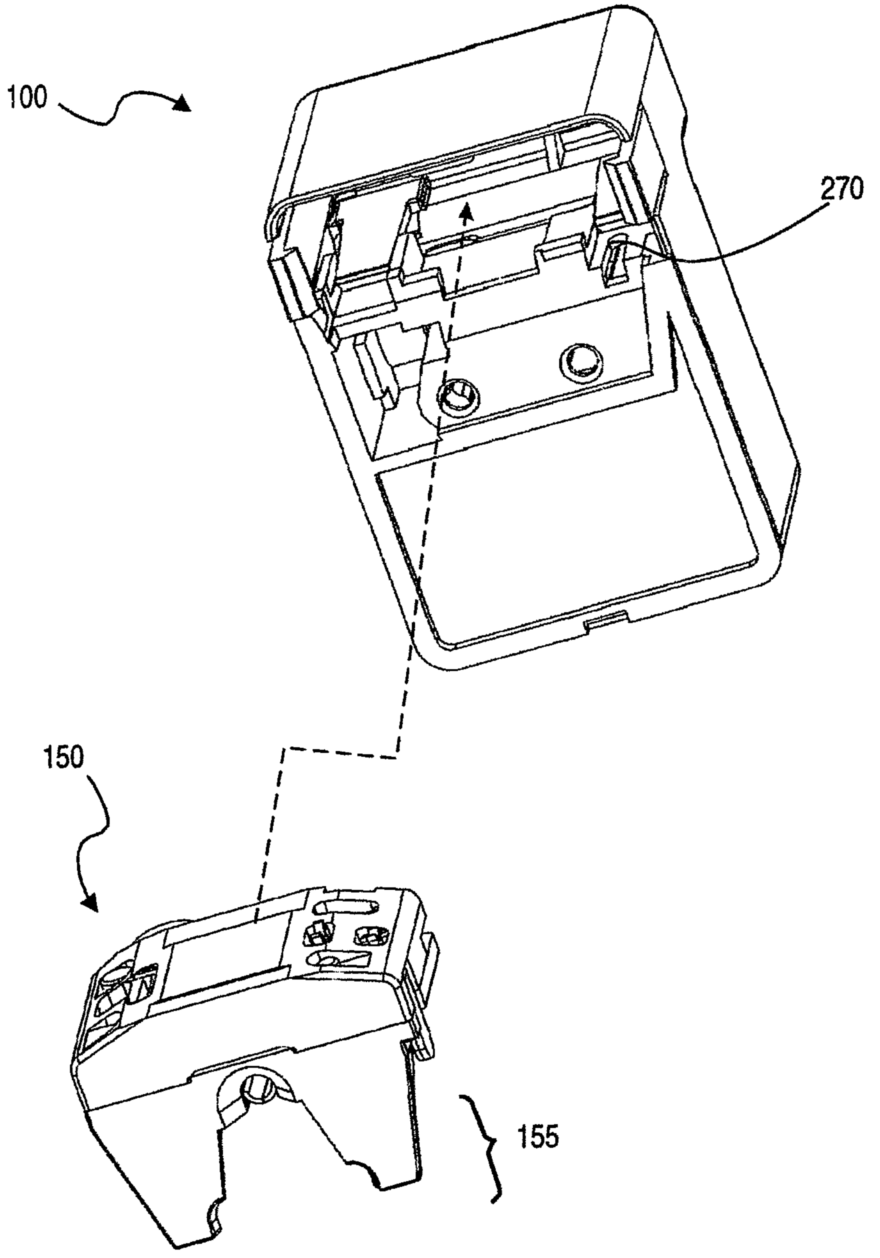
FIG. 9 is a perspective view of an example connecting package and overload protector for a refrigerator compressor according to embodiments herein.

FIG. 9 is a perspective view of connecting package 100 and overload protector 150, and illustrates how overload protector 150 can be coupled to connecting package 100, such as being inserted within an overload protector mounting section defined by connecting package 100. When the overload protector is mounted to the connecting package, the overload protector essentially closes-off test port access when inserted therein. FIG. 2 shows the overload protector 150 mounted in the connecting package and covering test port access with its wings. Thus, the overload protector acts as a cover for the test port.

For regulatory and/or practical purposes, an assembled connecting package cannot have a hole for a test probe because insects may enter through the hole and lay eggs, which can result in electrical shorts. Such devices do not need to be hermetically sealed, but still need to be sealed sufficiently to prevent intrusion from insects. For example, housing components such as a base a cover need to connect with each other such that any gaps between housing component contact points are less than about half a millimeter.

With the cover and base coupled, the connecting package provides a sealed electronic circuit test port. Thus, an access port is molded in the base to allow a test probe to contact the back of the triac terminal, from which all electrical tests can be conducted. This design feature allows the cover to be installed and then the electrical circuit to be tested (finished product). Conventional methods test motor starters with the cover removed, which may lead to quality/electrical problems in the product when the cover is installed due to the shifting of components. Whenever devices are tested prior to a final assembly and enclosure, there's always a chance that something is going to change between that test and final assembly. Accordingly, it is desirable to test a device as late as possible, such as after assembly or prior to shipping a particular device. With such an integrated test port and test terminal, after assembly the connecting package can be tested—with the cover joined to the base—to verify that the device is operating correctly. The access port (test port) can be environmentally sealed by virtue of the tolerances between the test port and test terminal. Additionally, the access port can be sealed when the motor protector is inserted. Such sealing means any gaps in the enclosure are less than about half a millimeter. The base can conform to the contours of the motor protector body and wings 155 of the overload protector to create a seal.

The test port can be used for various tests. For the PTC element, a low-power digital volt meter check can be executed so as not to heat the PTC element. While the connecting package includes external terminals for connecting to a refrigeration compressor, also known as the S-terminals, there is conventionally no access between the triac and the PTC element. The test port can also be used to bypass the PTC element when executing a reference cut in measurement. To avoid heating the PTC element, a low current can be provided through the triac to avoid changing a cut in parameter. Another test is a full test that includes testing a current envelope in which the PTC element heats up. By doing these other tests at the bypass and the PTC element, this technique substantially decreases the test time because once the PCT element is heated up, it is typically necessary to wait until the pill cools down (a few minutes) before packaging or other testing. Thus, accessing the test terminal on the enclosure reduces test time dramatically. Prior to such a mechanism, the various tests would be executed prior to putting a cover on the connecting package, such that after completing final assembly it would not be known whether individual interior components are functioning properly. Accordingly, the integrated unprotected test port enables quick testing subsequent to final assembly of the connecting package (though prior to connecting an overload protector or other test port covering).

Figure 10:
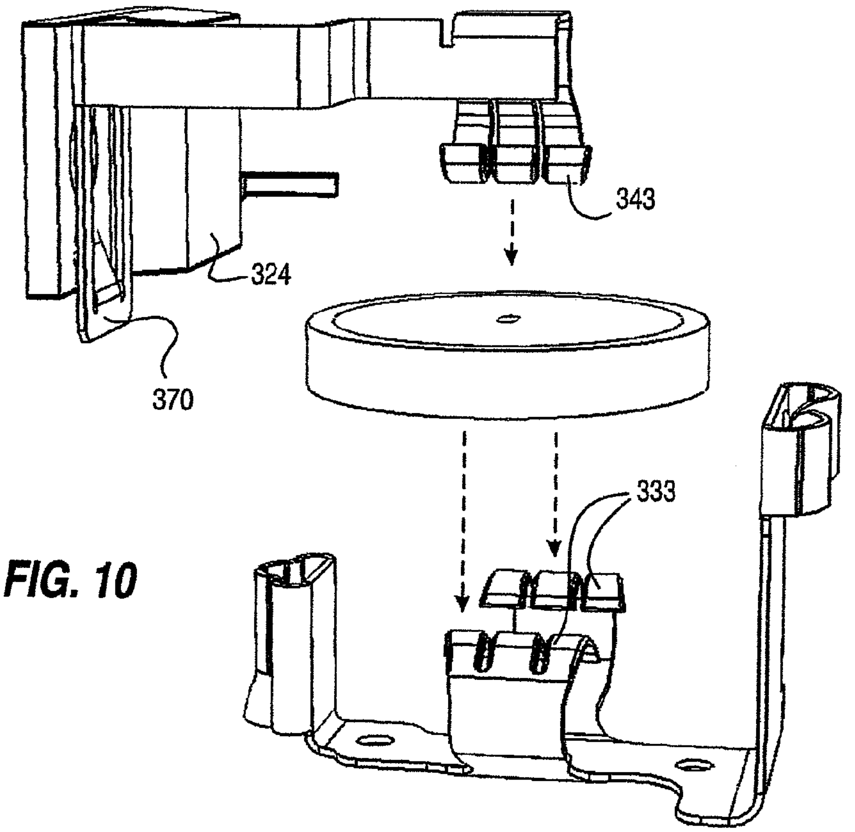
FIG. 10 is a side perspective view of an example PTC element and opposing springs according to embodiments herein.

FIG. 10 is a side perspective view of PTC element 335 and opposing springs 333 and 343. PTC element rests between opposing springs 333 and 343 when enclosed within connecting package 100. FIG. 10 also shows triac 324 and test terminal 370. Note that PTC element 335 can be substantially disc-shaped and positioned parallel to a bottom floor of the base 200. Upon coupling the base and cover and creating the housing enclosure, the PTC element 335 is firmly secured within the enclosure using the opposing springs. The opposing springs also provide an electrical contact to the electric motor starter circuit, and provide sufficient force to assist in fracturing a failed PTC element. The opposing springs and PTC element provide a 3-point integrated backup protection system (separate from the overload protector). The PTC contact system operates in a defined force window in order to achieve maximum reliability, that is, to assist in PTC element fracturing in response to PTC element failure. In other words, the springs are configured to cause the PTC element to break in a controlled manner. The springs function as electrical contacts with the PTC element when in connection with the spring contact. The device is constructed so that when the PTC element fragments, the fragmented PTC element is not able to continue an electrical connection between the springs.

The PTC element (also known as a pill due to a conventional shape) can be made of ceramic material (such as barium titanate). The PTC pill is not a fault protector itself, but serves to shut off the start winding. The PTC element has a material property such that when the PTC element heats up to a certain temperature (dependent on the particular materials used to build the PTC element) the PTC element changes from a very low resistance state to a very high resistance state. In operation, current flowing through a start winding is flowing in series to the PTC element, so the PTC element has a degree of resistance due to its self heating. At a subsequent point (typically after a half a second or second) the PTC element self heats sufficiently to reach a switch temperature causing the PTC element to quickly change to high resistance. The result of the quick transition to high resistance is cutting off the current, or cutting off most of the current. The remaining electronics can be used to completely shut off the current. For example, the triac can then be used to completely shut off current.

In a three-spring design, one or two of the springs can be positioned within the housing during assembly, while one or two of the springs are positioned within the cover so that when the cover is placed on the base, opposing spring forces will secure the PTC element within the enclosure. In addition to the spring or springs within the base, the base can include alignment structures or knobs that maintain the PTC element within a horizontal position during top-down assembly.

Figure 11:
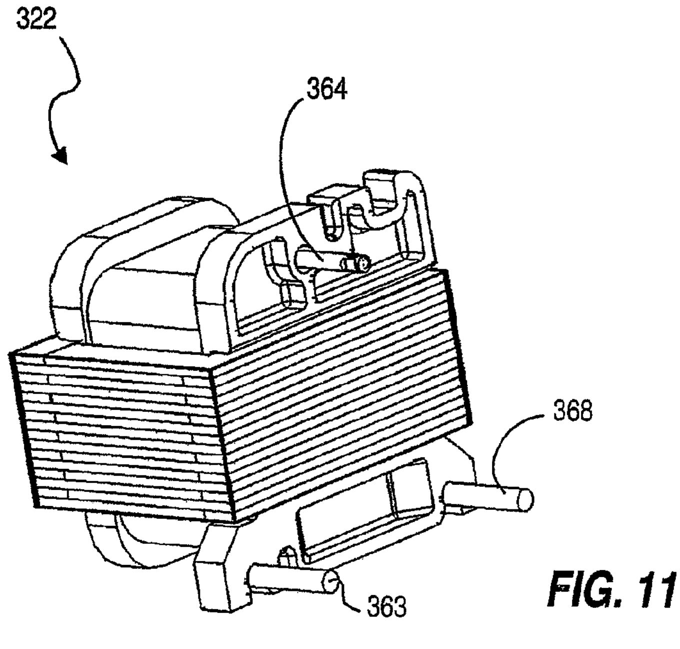
FIG. 11 is a perspective view of an example current transformer of a motor starter according to embodiments herein.

FIG. 11 is a perspective view of an example current transformer 322. The current transformer can be configured with three pins for electrical connection to the electric motor starter circuit. The three pins can be spaced to permit welding of the pins to the electric motor starter circuit via top-down assembly. That is, from a top view, the pins are sufficiently spaced to enable welding. The current transformer 322 can use a 3-pin configuration instead of a conventional 4-pin configuration. The 3-pin configuration provides a cost advantage. The 3-pin current transformer can be made by an internal connection of the primary and secondary windings to the neutral side. The 3-pin configuration eliminates one pin, a wire lead wrap operation, and one installation weld, resulting in a cost savings. For example, current transformer 322 includes primary hot pin 363, secondary hot pin 364, and primary/secondary neutral pin 368. The 3-pin triangular shaped design to allows welding (attachment) in a top-down assembly because all pins are directly accessible in the z-axis assembly direction.

Figure 12:
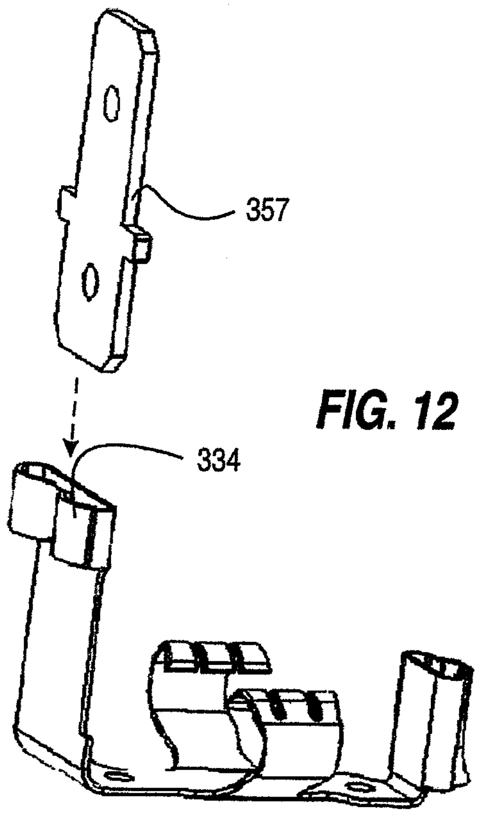
FIG. 12 is a perspective view of an example terminal connector according to embodiments herein.

FIG. 12 is a perspective view of an example terminal connector. Circuit elements can include female receptacle 334 and male connectors 357. Male connector 357 can be varied in configuration according to particular device specifications. By having female receptacles on connectors of the base, the base can be used for multiple different cover designs and configurations. Thus, electrical terminal receptacles can be configured to receive electrical terminals from an interior portion of the cover, with the electrical terminals from the interior portion of the cover protruding through an exterior surface (or exposed by the connecting package) of the cover. The protruding terminals can be configured to connect to a refrigeration compressor. The electrical terminal receptacles of the base can also be configured to receive electrical terminals from multiple different covers and configurations of the protruding terminals.

In other words, the device provides a platform design in which all customers can be served with a same base design and electrical components, but various covers. The covers allow mounting for different connections and terminations. To facilitate customized manufacturing, the cover terminals are connected to the base via a male/female spade connection. Connections can be made when the cover is fitted over the base. The connections can use quick connects, various types of electrical connectors, or screw based termination. Thus, the base can include various female spade connectors, while the various different covers can use male blade connectors to adapt to each given cover design, while the base and circuit elements remain common.

Figure 13:
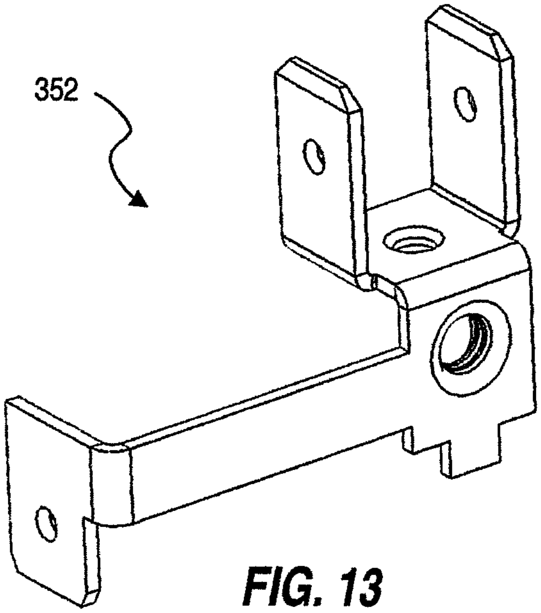
FIG. 13 is a perspective view of an example terminal according to embodiments herein.

FIG. 13 is a perspective view of terminal 352. Terminal 352 can function as a neutral terminal, and can have a portion located within the connecting package housing, and a portion protruding from the connecting package housing. Terminal 352 can also define an opening for receiving a screw.

Figure 14:
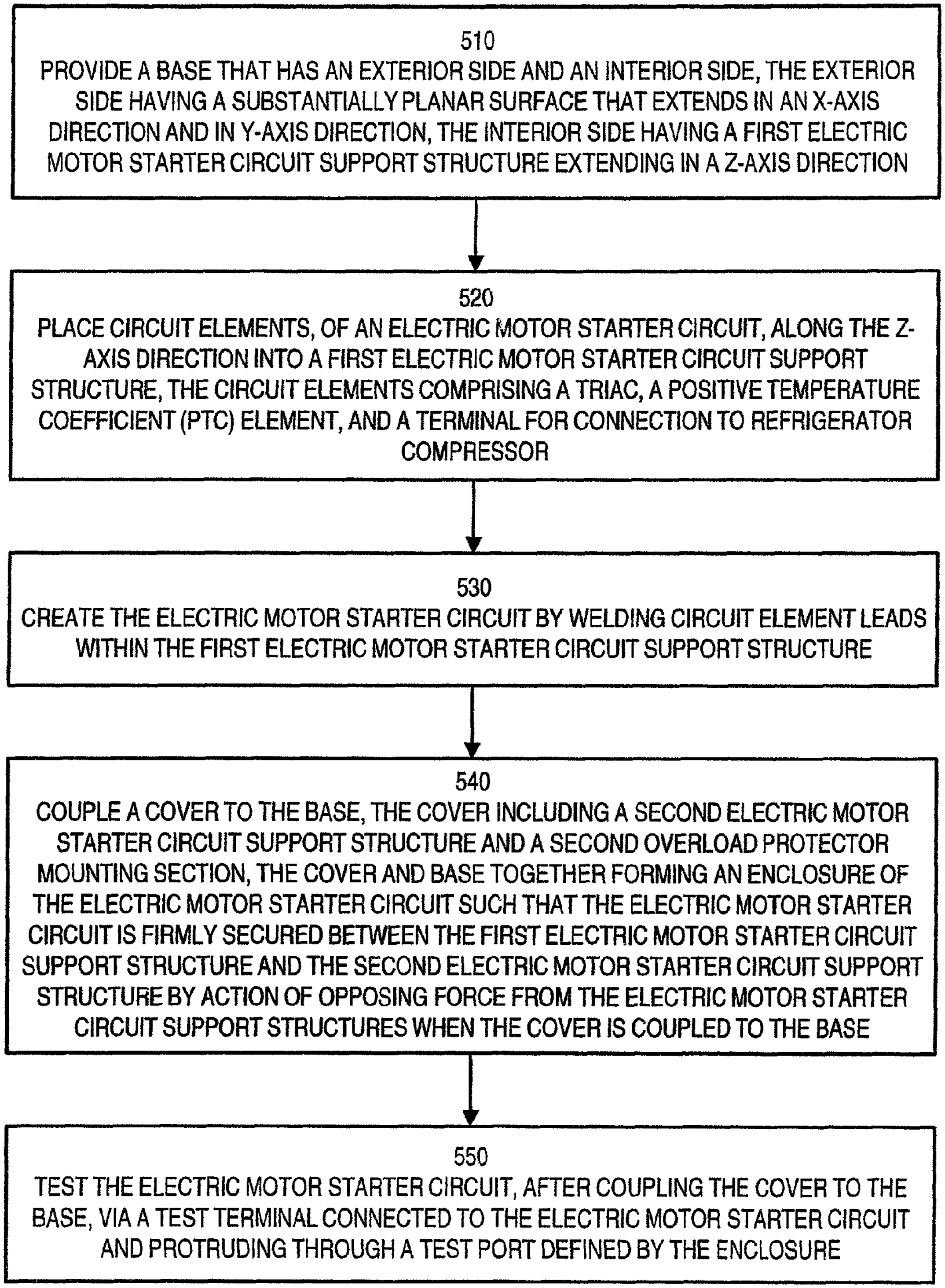
FIG. 14 is a flowchart illustrating an example of a process supporting manufacturing of a connecting package for a refrigerator compressor according to embodiments herein.

FIG. 14 is a flowchart illustrating an example of a process supporting manufacturing or assembly of connecting package 100.

In step 510, a base 200 is provided that has an exterior side and an interior side. The exterior side has a substantially planar surface that extends in an x-axis direction and in y-axis direction (a floor), and the interior side has a first electric motor starter circuit support structure extending in a z-axis direction. The base 200 can be provided from an injection molding process, or be provided by positioning such a base 200 on an assembly surface.

In step 520, an automated/robotic assembler places circuit elements, of an electric motor starter circuit, along the z-axis direction into a first electric motor starter circuit support structure. The circuit elements can include a triac 324, a positive temperature coefficient (PTC) element 335, and a terminal(s) for connection to a compressor.

In step 530, the electric motor starter circuit is created by welding circuit element leads within the first electric motor starter circuit support structure. Once again, this welding can be automated.

In step 540, the cover 400 and base 200 are coupled. The cover includes a second electric motor starter circuit support structure and a second overload protector mounting section. The cover and base together form an enclosure of the electric motor starter circuit such that the electric motor starter circuit is firmly secured between the first electric motor starter circuit support structure and the second electric motor starter circuit support structure by action of opposing force from the electric motor starter circuit support structures when the cover is coupled to the base.

In step 550, the electric motor starter circuit is tested, after coupling the cover to the base. Testing is executed via a test terminal 370 connected to the electric motor starter circuit 300 and protruding through or accessible through a test port 270 defined by the enclosure.

In step 560, an overload protector is mounted in the overload protector mounting sections of the base and the cover after testing the electric motor starter circuit. The test terminal is exposed in a location that becomes covered by the overload protector when the overload protector is mounted to the connecting package.

Note again that techniques herein are well suited for use in any type of connecting package application such as for gas or refrigerator compressors as discussed herein. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A connecting package for a compressor, the connecting package comprising:

an electric motor starter circuit having circuit elements including a triac, a positive temperature coefficient (PTC) element and terminals for connection to the compressor, where the circuit elements form a circuit by directly joining respective circuit element leads together;

a base including a first electric motor starter circuit support structure, the base being configured to receive the circuit elements in a z-axis direction for assembling the electric motor starter circuit on the base;

a cover including a second electric motor starter circuit support structure, the cover being configured so as to be coupled to the base; the cover and base when coupled together form an enclosure of the electric motor starter circuit such that the electric motor starter circuit is firmly secured between the first electric motor starter circuit support structure and the second electric motor starter circuit support structure by action of an opposing force from the first and second electric motor starter circuit support structures;

wherein the base includes a first overload protector mounting section, and wherein the cover includes a second overload protector mounting section, the connecting package further including an overload protector that is mounted in the overload protector mounting sections of the base and cover; and wherein the PTC element is firmly secured within the enclosure using opposing springs, the opposing springs providing an electrical contact to the electric motor starter circuit, the opposing springs providing sufficient force to assist in fracturing a failed PTC element.

2. The connecting package of claim 1, wherein the base and the first electric motor starter circuit support structure are configured to receive circuit elements via top-down mechanical assembly along the z-axis toward the bottom floor of the base prior to the cover being coupled to the base.

3. The connecting package of claim 1, wherein the enclosure defines a circuit test port that receives a test terminal connected to the electric motor starter circuit and accessible from an exterior of the enclosure for testing the electric motor starter circuit when firmly secured within the enclosure, the test terminal being distinct from the terminals for connection to the compressor.

4. The connecting package of claim 3, wherein the test terminal connects to the electric motor starter circuit at a location that enables testing of the triac and PTC element independently from testing the electric motor starter circuit.

5. The connecting package of claim 1, wherein the PTC element is substantially disc-shaped and positioned parallel to a bottom floor of the base.

6. The connecting package of claim 1, wherein the base includes electrical terminal receptacles configured to receive electrical terminals from an interior portion of the cover, the electrical terminals from the interior portion of the cover protruding through an exterior surface of the cover, the protruding terminals configured to connect to a refrigeration compressor, and wherein the electrical terminal receptacles of the base are configured to receive electrical terminals from multiple different covers and configurations of the protruding terminals.

7. The connecting package of claim 1, wherein the circuit elements include a current transformer, and wherein the current transformer has three pins for electrical connection to the electric motor starter circuit, the three pins spaced to permit welding of the pins to the electric motor starter circuit via top-down assembly.

8. The connecting package of claim 1, wherein the first electric motor starter circuit support structure extends substantially beyond exterior surfaces of the base, thereby facilitating automated top-down assembly of the electric motor starter circuit.

9. The connecting package of claim 1, wherein the enclosure does not contain a potting material.

10. The connecting package of claim 1, wherein the circuit elements of the electric motor starter circuit are not connected with a circuit board or other connection support structure.

11. A connecting package for a compressor, the connecting package comprising:

a base including an electric motor starter section and an overload protector mounting section;

an electric motor starter circuit having elements including a triac, a current transformer, a positive temperature coefficient (PTC) element, a resistor, and a capacitor;

a cover coupled to the base, the cover and base together forming an enclosure of the electric motor starter circuit, the enclosure defining a test port;

a test terminal connected to the electric motor starter circuit, the test terminal exposed by the test port and accessible from an exterior of the enclosure for testing the electric motor starter circuit when enclosed within the enclosure, the test terminal being distinct from terminals protruding from the enclosure for connecting with a refrigeration compressor; and an over overload protector mounted in the overload protector mounting section of the base to essentially close-off test port access when inserted therein.

12. The connecting package of claim 11, wherein the test terminal connects to the electric motor starter circuit at a location that enables testing of the triac and PTC element independently from testing the electric motor starter circuit.

13. The connecting package of claim 12, wherein the test terminal connects to the electric motor starter circuit at a location configured to bypass the PTC element to prevent the PTC element from heating when executing a reference cut in measurement test.

14. The connecting package of claim 11, wherein the test terminal provides an electrical connection to the motor starter electrical circuit between the triac and the PTC element.

15. A method of assembling a connecting package for a compressor, the method comprising:

providing a base that has an exterior side and an interior side, the exterior side having a substantially planar surface that extends in an x-axis direction and in y-axis direction, the interior side having a first electric motor starter circuit support structure extending in a z-axis direction;

via use of automated robotic equipment, placing circuit elements, of an electric motor starter circuit, along the z-axis direction into a first electric motor starter circuit support structure, the circuit elements comprising a triac, a positive temperature coefficient (PTC) element, and a terminal for connection to the compressor;

creating the electric motor starter circuit by welding circuit element leads within the first electric motor starter circuit support structure; and coupling a cover to the base, the cover including a second electric motor starter circuit support structure and a second overload protector mounting section, the cover and base together forming an enclosure of the electric motor starter circuit such that the electric motor starter circuit is firmly secured between the first electric motor starter circuit support structure and the second electric motor starter circuit support structure by action of opposing force from the electric motor starter circuit support structures when the cover is coupled to the base.

16. The method of claim 15, further comprising:

testing the electric motor starter circuit, after coupling the cover to the base, via a test terminal connected to the electric motor starter circuit and protruding through a test port defined by the enclosure; and after testing the electric motor starter circuit, mounting an overload protector in the overload protector mounting sections of the base and the cover, the overload protector covering the test terminal.

17. A connecting package for a compressor, the connecting package comprising:

an electric motor starter circuit having circuit elements including a triac, a positive temperature coefficient (PTC) element and terminals for connection to the compressor, where the circuit elements form a circuit by directly joining respective circuit element leads together;

a base including a first electric motor starter circuit support structure, the base being configured to receive the circuit elements in a z-axis direction for assembling the electric motor starter circuit on the base;

a cover including a second electric motor starter circuit support structure, the cover being configured so as to be coupled to the base; the cover and base when coupled together form an enclosure of the electric motor starter circuit such that the electric motor starter circuit is firmly secured between the first electric motor starter circuit support structure and the second electric motor starter circuit support structure by action of an opposing force from the first and second electric motor starter circuit support structures;

wherein the base includes a first overload protector mounting section, and wherein the cover includes a second overload protector mounting section, and the connecting package further including an overload protector that is mounted in the overload protector mounting sections of the base and cover; and wherein the base includes electrical terminal receptacles configured to receive electrical terminals from an interior portion of the cover, the electrical terminals from the interior portion of the cover protruding through an exterior surface of the cover, the protruding terminals configured to connect to a refrigeration compressor, and wherein the electrical terminal receptacles of the base are configured to receive electrical terminals from multiple different covers and configurations of the protruding terminals.

18. The connecting package of claim 17, wherein the base and the first electric motor starter circuit support structure are configured to receive circuit elements via top-down mechanical assembly along the z-axis toward the bottom floor of the base prior to the cover being coupled to the base.

19. The connecting package of claim 17, wherein the enclosure defines a circuit test port that receives a test terminal connected to the electric motor starter circuit and accessible from an exterior of the enclosure for testing the electric motor starter circuit when firmly secured within the enclosure, the test terminal being distinct from the terminals for connection to the compressor.

20. The connecting package of claim 19, wherein the test terminal connects to the electric motor starter circuit at a location that enables testing of the triac and PTC element independently from testing the electric motor starter circuit.

21. The connecting package of claim 17, wherein the PTC element is substantially disc-shaped and positioned parallel to a bottom floor of the base.

22. The connecting package of claim 21, wherein the PTC element is firmly secured within the enclosure using opposing springs, the opposing springs providing an electrical contact to the electric motor starter circuit, the opposing springs providing sufficient force to assist in fracturing a failed PTC element.

23. The connecting package of claim 17, wherein the circuit elements include a current transformer, and wherein the current transformer has three pins for electrical connection to the electric motor starter circuit, the three pins spaced to permit welding of the pins to the electric motor starter circuit via top-down assembly.

24. The connecting package of claim 17, wherein the first electric motor starter circuit support structure extends substantially beyond exterior surfaces of the base, thereby facilitating automated top-down assembly of the electric motor starter circuit.

25. The connecting package of claim 17, wherein the enclosure does not contain a potting material.

26. The connecting package of claim 17, wherein the circuit elements of the electric motor starter circuit are not connected with a circuit board or other connection support structure.

* * * * *